Patented May 15, 1951

2,552,540

UNITED STATES PATENT OFFICE 2,552,540

O-METHOXY O-ALKYL AMIDOTHIO-PHOSPHATES

Lewis R. Drake, Midland, and Arthur J. Erbel, Bay City, Mich., assignors to The Dow Chemical Company, Midland, Mich., a corporation of Delaware No Drawing. Application April 15, 1949, Serial No. 87,846

6 Claims. (Cl. 260—461)

This invention is concerned with the O-(methoxyphenyl) O-alkyl amidothiophosphates having the formula

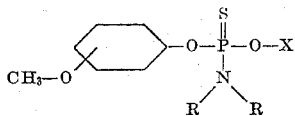

wherein X represents a lower alkyl radical containing from 1 to 4 carbon atoms, and each R represents an alkyl radical or hydrogen.

These new products may be prepared by reacting an O-(methoxyphenyl) dichlorothiophosphate having the formula

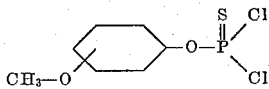

with a monohydric alcohol and the intermediate product so obtained with an alkyl amine or ammonia.

In carrying out the first phase of this reaction, 1 molecular proportion of a monohydric alcohol is dissolved in at least 1 molecular proportion of pyridine and the resulting solution reacted portionwise with 1 molecular proportion of an O-(methoxyphenyl) dichlorothiophosphate. The latter may be dissolved in benzene or other suitable solvent. The reaction is carried out with stirring and at a temperature of from about 25° to 78° C.

In the second phase of the reaction, the above intermediate is reacted with an alkyl amine or ammonia. Where it is desired to introduce an alkyl amine into the molecule, 1 molecular proportion of the amine dissolved in at least 1 molecular proportion of pyridine is added portionwise to the intermediate with stirring at a temperature of from about 25° to 78° C. Where an —NH2 group is to be introduced into the molecule, the intermediate is added to a large excess of liquid ammonia. If desired, by-product pyridine hydrochloride may be separated from the intermediate prior to reaction with ammonia.

The crude O-(methoxyphenyl) O-alkyl amidothiophosphate products as obtained in the practice of the foregoing reactions have utility without further modification as constituents of parasiticidal mixtures. However, some purification is frequently desirable. In one such operation, the crude reaction mixture is filtered to separate pyridine hydrochloride and ammonia hydrochloride. The product is then successively treated with alkali, acid and water to separate traces of reactants and by-product hydrochlorides.

The O-(methoxyphenyl) dichlorothiophosphates employed as starting materials, as above described, may be prepared by several methods. One such procedure includes reacting a 2-, 3- or 4-methoxyphenol with phosphorus trichloride (PCl3) in the presence of magnesium chloride, as catalyst, to produce an O-(methoxyphenyl) dichlorophosphite intermediate of the formula

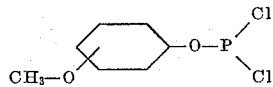

This intermediate is then reacted with sulphur at elevated temperatures. In carrying out the above reaction, 7 molecular proportions of phosphorus trichloride, 1 molecular proportion of the methoxyphenol and 0.01 molecular proportion of magnesium chloride are mixed together and heated at the boiling temperature of phosphorus trichloride (76° to 82° C.) and under reflux. Upon completion of the reaction as noted by the cessation of hydrogen chloride evolution, excess phosphorus trichloride is stripped from the reaction zone by fractional distillation under reduced pressure, and 1 molecular proportion of sulphur added to the residual mixture. The latter is warmed at 150° to 170° C. for about ½ hour to accomplish the dispersion of the sulphur. The temperature of the reaction mixture is then gradually raised until an exothermic reaction is initiated between the O-(methoxyphenyl) dichlorophosphite and sulphur, whereupon the pot temperature rapidly rises to about 240° C. Upon completion of the reaction, the crude mixture is fractionally distilled under reduced pressure to obtain the desired O-(methoxyphenyl) dichlorothiophosphate.

The O-(methoxyphenyl) O-alkyl amidothiophosphates of the present invention are oils or crystalline solids, substantially insoluble in water, somewhat soluble in many organic solvents, and non-corrosive to the skin of man and higher animals. They are of value as toxic constituents of insecticidal and fungicidal compositions.

The following examples illustrate the invention but are not to be construed as limiting.

*Example 1.—O-(2-methoxyphenyl) O-methyl amidothiophosphate*

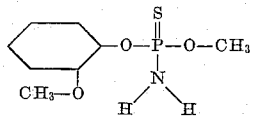

1.6 grams (0.05 mole) of methanol was dissolved in 3.9 grams (0.05 mole) of pyridine at 25° C. and added portionwise with stirring to 12.6 grams (0.05 mole) of O-(2-methoxyphenyl) dichlorothiophosphate (having a boiling point of 131° to 132° C. at 1.5 millimeters' pressure, a density of 1.405 at 25° C. and a refractive index $n/D$ of 1.5692 at 35° C.) dissolved in 50 milliliters of benzene. The temperature rose 20° C. during the reaction and the resulting mixture was allowed to stand for 16 hours at room temperature. This intermediate product was then poured into 50 milliliters of liquid ammonia, the excess ammonia evaporated off over a period of 16 hours at room temperature, and the crude reaction mixture filtered to separate pyridine hydrochloride and ammonia hydrochloride. The filtrate was then successively washed with dilute aqueous sodium hydroxide, dilute aqueous hydrochloric acid and water, and dried with anhydrous sodium sulphate. The benzene was removed by evaporation to obtain an O-(2-methoxyphenyl) O-methyl amidothiophosphate as an oily liquid having a density of 1.49 at 23° C., and a refractive index $n/D$ of 1.5636 at 35° C.

*Example 2. — O-(4-methoxyphenyl) O-ethyl amidothiophosphate*

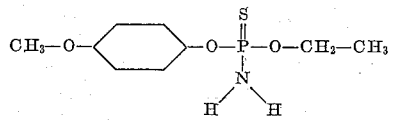

1.65 grams (0.05 mole) of ethanol was dissolved in 3.9 grams (0.05 mole) of pyridine and added portionwise with stirring to 12.6 grams (0.05 mole) of O-(4-methoxyphenyl) dichlorothiophosphate (having a boiling point of 147° to 150° C. at 2.5 millimeters' pressure, a density of 1.413 at 25° C. and a refractive index $n/D$ of 1.5710 at 35° C.) dissolved in 50 milliliters of benzene as previously described. The temperature rose about 20° C. during the addition and the resulting mixture was allowed to stand for 16 hours at room temperature. This intermediate product was then poured into 50 milliliters of liquid ammonia and the excess ammonia evaporated off over a period of 16 hours at room temperature. The crude reaction mixture was then processed as described in Example 1 to obtain an O-(4-methoxyphenyl) O-ethyl amidothiophosphate product as a crystalline solid melting at 113° to 115° C.

*Example 3.—O-(3-methoxyphenyl) O-isopropyl amidothiophosphate*

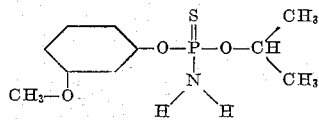

3.0 grams (0.05 mole) of isopropanol was dissolved in 3.9 grams (0.05 mole) of pyridine and added portionwise with stirring to 12.6 grams (0.05 mole) of O-(3-methoxyphenyl) dichlorothiophosphate (having a boiling point of 131° to 132° C. at 4 millimeters' pressure, a density of 1.40 at 27° C. and a refractive index of 1.5709 at 35° C.) dissolved in 50 milliliters of benzene as described in Example 1. The temperature rose 5° C. during the addition. This intermediate product was then poured into 50 milliliters of liquid ammonia and the excess ammonia evaporated off over a period of 16 hours. The crude reaction mixture was then filtered, the filtrate washed and dried, and the benzene removed by evaporation in the usual manner. As a residue, there was obtained an O-(3-methoxyphenyl) O-isopropyl amidothiophosphate product as an oily liquid having a density of 1.457 at 23° C. and a refractive index $n/D$ of 1.5556 at 35° C.

*Example 4. — O-(4-methoxyphenyl) O-normalbutyl amidothiophosphate*

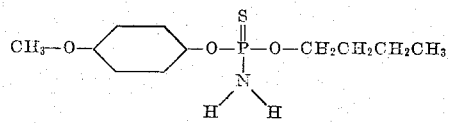

In a similar manner, 0.039 mole quantities of normalbutyl alcohol, pyridine, and O-(4-methoxyphenol) were reacted in benzene and the intermediate product so-obtained subsequently reacted with excess liquid ammonia. The crude reaction mixture was then processed in the usual fashion to obtain an O-(4-methoxyphenyl) O-normalbutyl amidothiophosphate product as a crystalline solid melting at 134° to 136° C.

*Example 5.—O-(4-methoxyphenyl) O-methyl N-ethylamidothiophosphate*

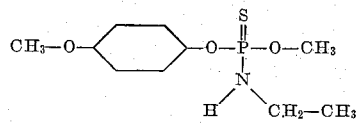

1.6 grams (0.05 mole) of methanol was dissolved in 3.9 grams (0.05 mole) of pyridine and added portionwise with stirring to 12.6 grams (0.05 mole) of O-(4-methoxyphenyl) dichlorothiophosphate dissolved in 50 milliliters of benzene as previously described. The temperature rose 5° C. during the addition. 2.25 grams (0.05 mole) of ethylamine dissolved in 3.9 grams (0.05 mole) of pyridine was then added portionwise to the above intermediate product with stirring and at 25° C. The addition was carried out with a 54° temperature rise and the resulting mixture thereafter allowed to stand at room temperature for 16 hours. Pyridine hydrochloride was then separated by filtration and the reaction mixture processed in the usual manner to obtain an O-(4-methoxyphenyl) O-methyl N-ethylamidothiophosphate product as an oily liquid having a density of 1.445 at 23° C. and a refractive index $n/D$ of 1.5568 at 35° C.

*Example 6.—O-(4-methoxyphenyl) O-ethyl N-normalbutylamidothiophosphate*

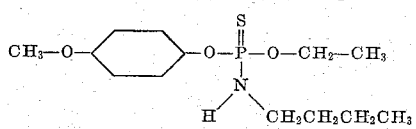

0.05 mole quantities of ethanol, pyridine and O - (4 - methoxyphenyl) dichlorothiophosphate were reacted in benzene as described in Example 2. 3.65 grams (0.05 mole) of normalbutylamine dissolved in 3.9 grams (0.05 mole) of pyridine was then reacted with the above intermediate product as described in Example 5. The temperature rose 20° C. during the addition. The crude reaction mixture was then processed in the usual manner to obtain an O-(4-methoxyphenyl) O-ethyl N-normalbutylamidothiophosphate product as an oily liquid having a density of 1.364 at 23° C. and a refractive index of $n/D$ of 1.5420 at 35° C.

*Example 7.—O-(4-methoxyphenyl) O-ethyl N,N-diethylamidothiophosphate*

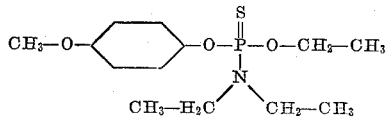

0.05 mole quantities of ethanol, pyridine and O - (4 - methoxyphenyl) dichlorothiophosphate were reacted in 50 milliliters of benzene as described in Example 6. 3.6 grams (0.05 mole) of diethylamine dissolved in 3.9 grams (0.05 mole) of pyridine was then added portionwise to the above intermediate product with stirring. During the addition, the temperature rose 17° C. and the resulting mixture was set aside for 16 hours. The crude mixture was then processed in the usual fashion to obtain an O-(4-methoxyphenyl) O-ethyl N,N-diethylamidothiophosphate product as an oily liquid. The latter had a density of 1.385 at 23° C. and a refractive index $n/D$ of 1.5422 at 35° C.

*Example 8.—O-(2-methoxyphenyl) O-ethyl N,N-diethylamidothiophosphate*

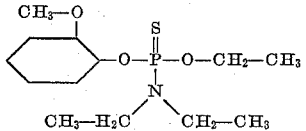

In a similar fashion, 0.05 mole quantities of ethanol, O-(2-methoxyphenyl) dichlorothiophosphate and diethylamine, and 0.1 mole of pyridine were reacted in 50 milliliters of benzene to obtain an O-(2-methoxyphenyl) O-ethyl N,N-diethylamidothiophosphate product as an oily liquid. The latter had a density of 1.437 at 23° C. and a refractive index $n/D$ of 1.5460 at 35° C.

*Example 9.—O-(4-methoxyphenyl) O-methyl N,N-diethylamidothiophosphate*

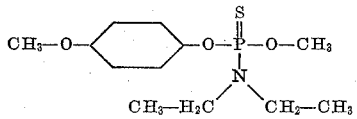

1.6 grams (0.05 mole) of methanol was dissolved in 3.9 grams (0.05 mole) of pyridine and added portionwise with stirring to 12.6 grams (0.05 mole) of O-(4-methoxyphenyl) dichlorothiophosphate dissolved in 50 milliliters of benzene as previously described. 3.6 grams (0.05 mole) of diethylamine dissolved in 3.9 grams (0.05 mole) of pyridine was then added portionwise to the above intermediate product with stirring and the resulting mixture set aside for 16 hours. The crude mixture was then processed in the usual manner to obtain an O-(4-methoxyphenyl) O-methyl N,N-diethylamidothiophosphate product as an oily liquid having a refractive index $n/D$ of 1.5670 at 35° C.

In a similar manner, other O-methoxyphenyl O-alkyl amidothiophosphates may be prepared of which the following are representative.

O-(3-methoxyphenyl) O-normalbutyl N,N-disecondarybutylamidothiophosphate by reacting normalbutyl alcohol, O-(3-methoxyphenyl) dichlorothiophosphate disecondarybutylamine, and pyridine.

O-(2-methoxyphenyl) O-ethyl N-normalhexylamidothiophosphate by reacting ethanol, O-(2-methoxyphenyl) dichlorothiophosphate, normalhexylamine, and pyridine.

O-(4-methoxyphenyl) O-normalbutyl N-decylamidothiophosphate by reacting normalbutyl alcohol, O-(4-methoxyphenyl) dichlorothiophosphate, normaldecylamine, and pyridine.

O-(4-methoxyphenyl) O-isopropyl N-dodecylamidothiophosphate by reacting isopropyl alcohol, O - (4-methoxyphenyl) dichlorothiophosphate, dodecylamine, and pyridine.

O - (2 - methoxyphenyl) O-ethyl N-dodecylamidothiophosphate by reacting ethanol, O-(2-methoxyphenyl) dichlorothiophosphate, dodecylamine, and pyridine.

These new amidothiophosphate products have been found effective as insecticides and fungicides and are adapted to be employed for the control of agricultural pests. In representative operations, the products of the preceding examples have been tested for the control of two-spotted spider mite, bean aphid, Mexican bean beetle and southern army worms. Against these organisms, 100 per cent kills have been obtained with spray compositions containing from 0.5 to 3 pounds of toxicant per 100 gallons of solution. Such spray mixtures have contained the new products in combination with representative wetting and emulsifying agents.

We claim:

1. An O-(methoxyphenyl) O-alkyl amidothiophosphate having the formula

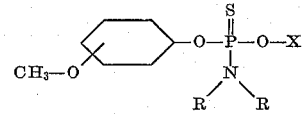

wherein X represents a lower alkyl radical containing from 1 to 4 carbon atoms, inclusive, and each R represents a member of the group consisting of the alkyl radicals and hydrogen.

2. O-(4-methoxyphenyl) O-ethyl amidothiophosphate.

3. O-(4-methoxyphenyl) O-methyl N-ethylamidothiophosphate.

4. O-(2-methoxyphenyl) O-methyl amidothiophosphate.

5. O-2-methoxyphenyl O-ethyl N,N-diethylamidothiophosphate.

6. O-4-methoxyphenyl O-ethyl N,N-diethylamidothiophosphate.

LEWIS R. DRAKE.
ARTHUR J. ERBEL.

REFERENCES CITED

The following references are of record in the file of this patent:

UNITED STATES PATENTS

| Number | Name | Date |
| --- | --- | --- |
| 2,299,535 | Dickey | Oct. 20, 1942 |